United States Patent [19]

Collins et al.

[11] 3,928,284

[45] Dec. 23, 1975

[54] ORGANOTIN COMPOUNDS STABILIZERS FOR VINYL HALIDE POLYMERS

[75] Inventors: John D. Collins, Albrighton; Harold Coates, Wombourn; Iftikhar Hussain Siddiqui, Birmingham, all of England

[73] Assignee: Albright & Wilson Limited, Oldburg near Birmingham, England

[22] Filed: Apr. 24, 1974

[21] Appl. No.: 463,452

Related U.S. Application Data

[62] Division of Ser. No. 308,018, Nov. 20, 1972, abandoned.

[52] U.S. Cl. .................. 260/45.75 S; 260/45.7 P; 260/45.75 J; 260/45.95 R; 260/429.7
[51] Int. Cl.² .......................................... C08J 3/20
[58] Field of Search.................. 260/45.75 K, 45.7 P

[56] References Cited
UNITED STATES PATENTS

| | | | |
|---|---|---|---|
| 3,196,129 | 7/1965 | Hechenkleikner | 260/45.75 |
| 3,398,114 | 8/1968 | Kauder | 260/45.75 |

*Primary Examiner*—V. P. Hoke
*Attorney, Agent, or Firm*—Robert P. Auber; Kenneth G. Wheeless; Robert Spector

[57] ABSTRACT

Novel chemical compounds having the general formula

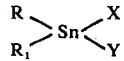

where R and $R_1$ are the same or different and are $C_1$ to $C_{12}$ alkyl groups, cycloalkyl groups or phenyl groups, X is

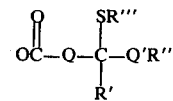

where
Q is $-(CH_2)_nS-$ or nothing,
Q' is sulphur if Q is nothing or is nothing if Q is $-(CH_2)_nS-$
R' is hydrogen, $C_1$ to $C_{20}$ alkyl or cycloalkyl or is aryl or substituted aryl,
R'' is $C_1$ to $C_{20}$ alkyl, aryl, substituted aryl or $CH_2COOR_2$ where $R_2$ is a short chain alkyl group of 1 to 8 carbon atoms or
R' and R'' may combine to form an alicyclic ring when Q' is nothing R''' is $R_3$ or is $(CH_2)_n COOR_3$
where $R_3$ is an alkyl group of from 1 to 20 carbon atoms, a cycloalkyl group, a cyclic ether group or an aryl group and or is an integer from 1 to 4 or
X is

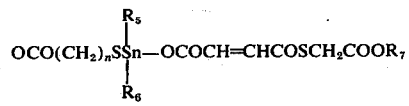

where $R_5$ and $R_6$ are selected for the same groups as R and $R_1$ and $R_7$ is selected from the same groups as R' and
Y is either the same as X or is different from X and is selected from the same group of radicals as X or is $S(CH_2)_nCOOR_4$ or $OOCCH=CHCOOR_4$ or is $OOCCH=CHCOSCH_2COOR_4$ if X is

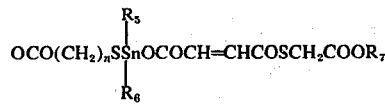

where $R_4$ is an alkyl group of from 1 to 20 carbon atoms, a cycloalkyl group or an aryl group are of use as stabilisers for homo and co polymers of vinyl chloride.

19 Claims, No Drawings

ORGANOTIN COMPOUNDS STABILIZERS FOR VINYL HALIDE POLYMERS

This is a divisional of application Ser. No. 308,018, filed Nov. 20, 1972, now abandoned.

The present invention relates to organotin compounds and to their use as stabilisers for polymeric materials in particular halogenated resins such as polymers and copolymers of vinyl and vinylidene chloride.

The use of organotin compounds containing sulphur as stabilisers for halogenated resins has for many years been recognised as being highly effective. However, the compounds employed have normally been those having a comparatively high tin content and so, in view of the high cost of tin, are expensive relative to other available stabilisers. Thus, despite their high efficiency these compounds are still not as widely used as other, less effective, materials.

The compounds of the present invention are sulphur-containing organotin compounds which have a lower tin content than most conventional sulphur-containing organotin compounds and so are potentially cheaper. The stabilising ability of some of them may match that of some of the conventional materials and so may be able to achieve the same degree of stabilisation for lower cost.

Accordingly, the present invention provides a new chemical compound having the general formula

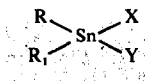

where R and $R_1$ are the same or different and are $C_1$ to $C_{12}$ alkyl groups, cycloalkyl groups or phenyl groups, X is

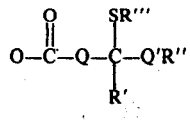

where

Q is $-(CH_2)_nS-$ or nothing,

Q' is sulphur if Q is nothing or is nothing if Q is $-(CH_2)_nS-$

R' is hydrogen, $C_1$ to $C_{20}$ alkyl or cycloalkyl or is aryl or substituted aryl, R'' is $C_1$ to $C_{20}$ alkyl, aryl, substituted aryl or $CH_2COOR_2$ where $R_2$ is a short chain alkyl group of 1 to 8 carbon atoms or R' and R'' may combine to form an alicyclic ring when Q' is nothing R''' is $R_3$ or is $(CH_2)_n COOR_3$ where $R_3$ is an alkyl group of from 1 to 20 carbon atoms, a cyclic ether group or an aryl group and n is an integer from 1 to 4 or X is

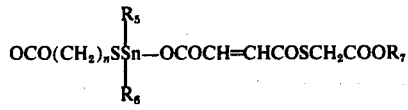

where $R_5$ and $R_6$ are selected for the same groups as R and $R_1$ and $R_7$ is selected from the same groups as R' and Y is either the same as X or is different from X and is selected from the same group of radicals as X or is $S(CH_2)_nCOOR_4$ or $OOCCH=CH\ COOR_4$ or is $OOCCH=CH\ COSCH_2COOR_4$ if X is

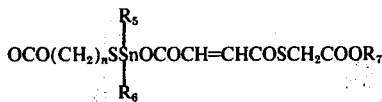

where $R_4$ is an alkyl group of from 1 to 20 carbon atoms a cycloalkyl, phenyl or a

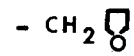

group.

From another aspect the present invention provides a process for producing compounds of the above formula which comprise reacting an organotin oxide of the formula

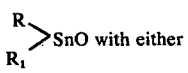 with either 1. a mixture of
   a. an aldehyde or ketone of the formula

if Q' is nothing or of the formula

If Q' is sulphur and
   b. a mixture of compounds of the formula R'''SH and HOOC QH if Q is $(CH_2)_nS$ or with a mixture of compounds of the formulae R'''SH and R''Q'H if Q' is sulphur, or 2. the preformed reaction product of such a mixture, and optionally one of $HOOCCH=CHCOSCH_2$, $HS(CH_2)_n\ COOR_4$ and $HOOCCH=CHCOOR_4$ Examples of particular types of compounds according to the present invention include

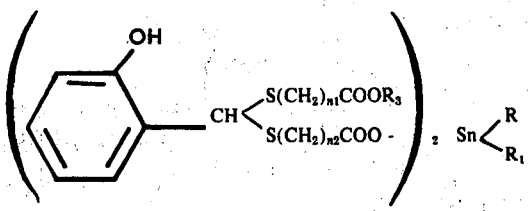

where n1 and n2 may each be the same or different. Such a compound is derived from

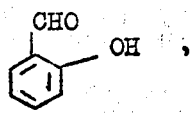

HS(CH$_2$)$_{n1}$COOR$_3$, HS(CH$_2$)$_{n2}$COOH and

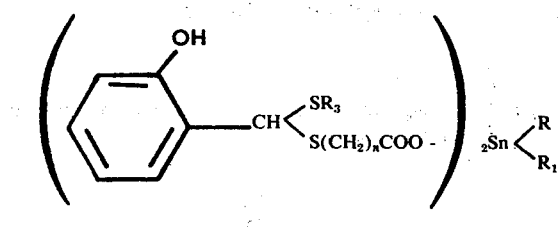

such a compound is obtained from

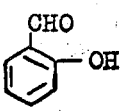

HS(CH$_2$)$_n$COOH, R$_3$SH and

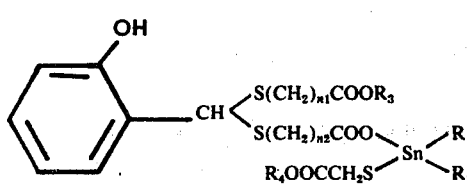

such a compound is obtained from

HO, HS(CH$_2$)$_{n1}$COOR$_3$,
HS(CH$_2$)$_{n2}$COOH R$_4$OOCCH$_2$SH and

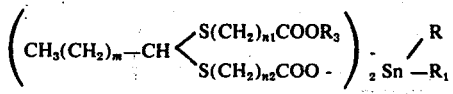

where m is 1 to 12. Such a compound is obtained from
CH$_3$(CH$_2$)$_m$CHO, HS(CH$_2$)$_{n1}$COOR$_3$,
HS(CH$_2$)$_{n2}$COOH and

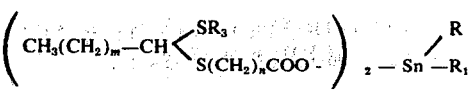

such a compound is obtained from CH$_3$(CH$_n$)$_m$CHO,
R$_3$SH, HS(CH$_2$)$_n$COOH and

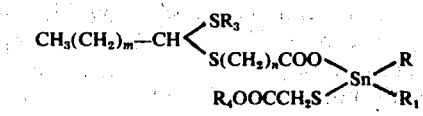

such a compound is obtained from CH$_3$(CH$_2$)$_m$CHO,
R$_3$SH, HS(CH$_2$)$_n$COOH, R$_4$OOCCH$_2$SH and

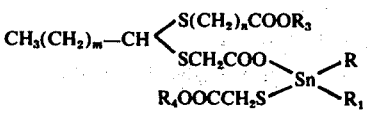

such a compound is obtained from CH$_3$(CH$_2$)$_m$CHO,
HS(CH$_2$)$_n$COOR$_3$, HSCH$_2$COOH, R$_4$OOCCH$_2$SH and

such a compound is obtained from R''SH, R$_3$SH, $$\overset{O}{\underset{}{H\overset{\|}{C}COOH}}$$
and

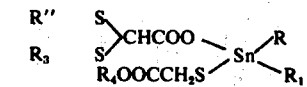

such a compound is obtained from R''SH, R$_3$SH, $$\overset{O}{\underset{}{H\overset{\|}{C}COOH}},$$

R₄OOCH₂SH and

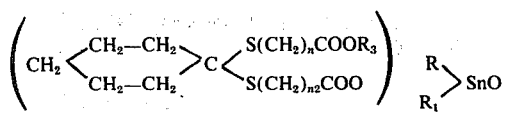

such a compound is obtained from cyclohexane, HS(CH₂)$_{n1}$COOR₃ HS(CH₂)$_{m2}$COOH and

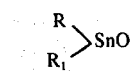

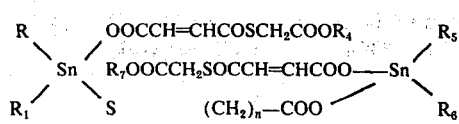

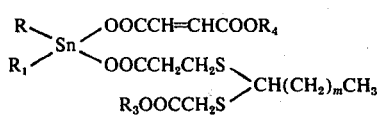

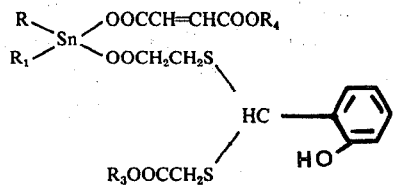

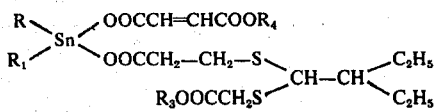

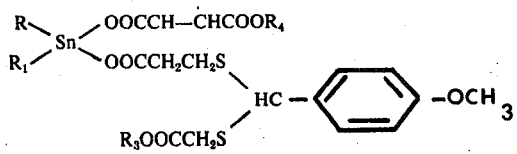

It is normally preferred that all of R and R₁, R₅ and R₆ are the same. Frequently they are alkyl or cycloalkyl groups of from 4 to 8 carbon atoms such as n-butyl, cyclohexyl, n-octyl, iso-octyl or 2-ethylhexyl groups. R₃ is preferably an alkyl group having from 8 to 16 carbon atoms, such as an n-octyl, 2-ethylhexyl, lauryl or cetyl group. R₄ is preferably one of the preferred R₃ groups. R' is frequently hydrogen, R'' is frequently a straight chain fatty alkyl group of the formula (CH₂)$_m$ CH₃ where $m$ is 1 to 20 such as an undecanoic group, a shorter branched chain group such as a secondary amyl group, a cyclo alkyl group such as a cyclohexyl or substituted cyclohexyl group or an aryl group such as a

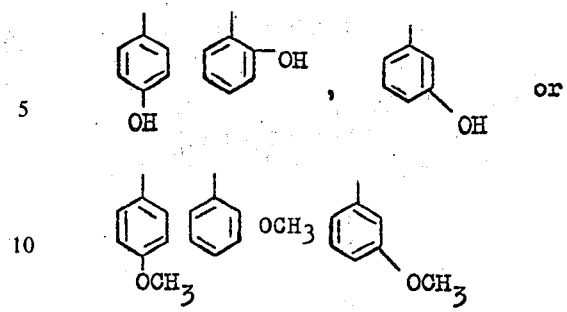

group, alternatively R' and R'' may combine to form a 5 or 6 membered alicyclic ring.

Typical compounds according to the invention include:

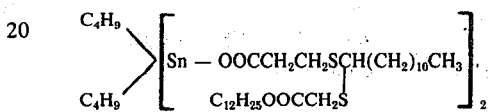

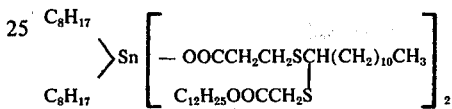

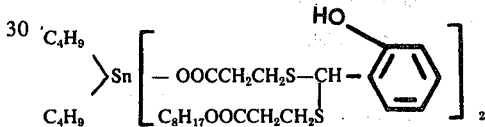

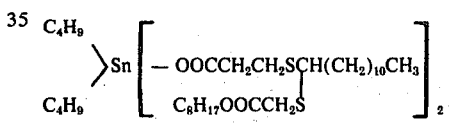

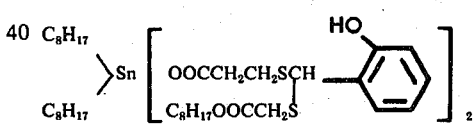

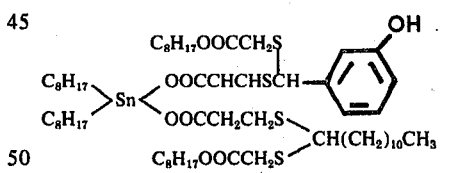

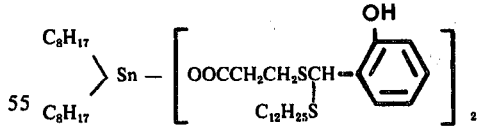

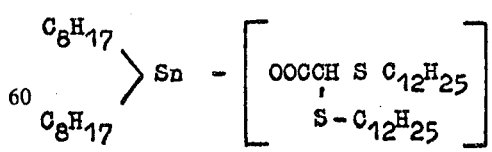

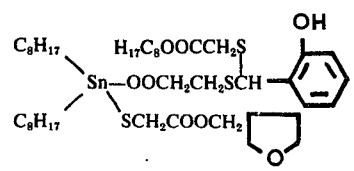

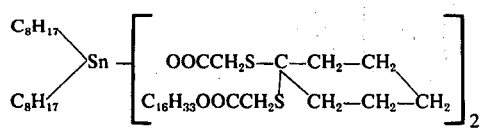

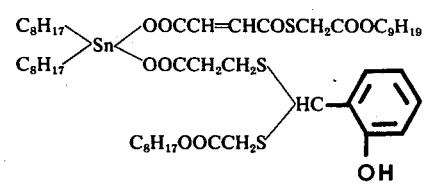

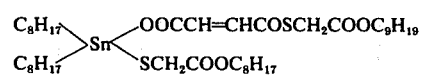

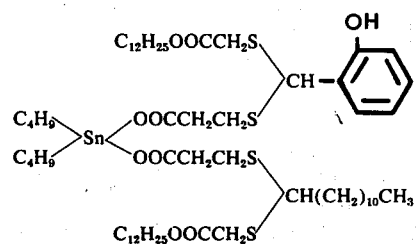

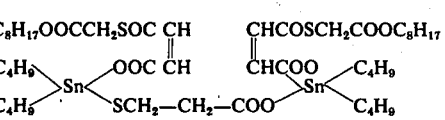

and the di-octyl tin analogues thereof AND

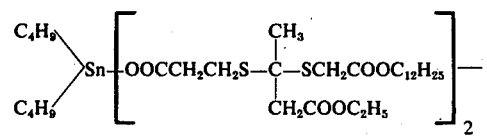

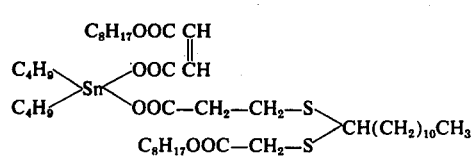

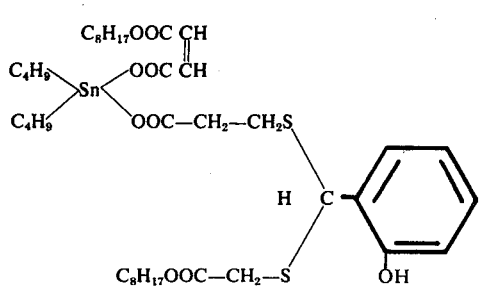

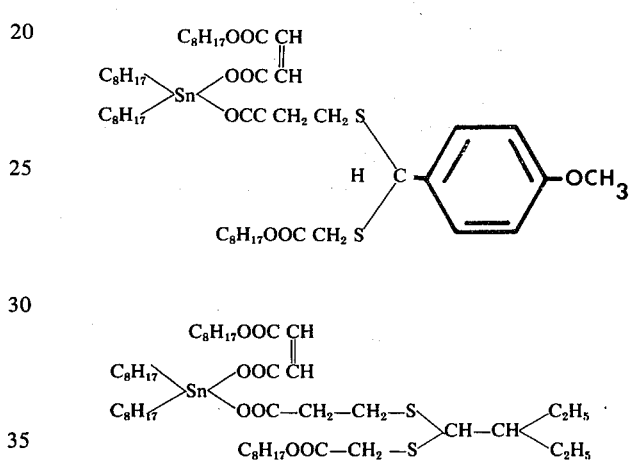

As previously mentioned the compounds of the invention are generally prepared by the reaction of an aldehyde or ketone with a mixture of mercaptan or ester of a thio substituted carboxylic acid such as thioglycolic acid or β-mercapto propionic acid admixed with such an acid. Either during this reaction or subsequently further reaction with a diorganotin oxide is carried out. Either the diorganotin oxide can be caused to react with only one compound formed in this manner or with a mixture of such compounds or it can be caused to react with a mixture of one such compound and a simple thioglycollate or half esterified maleic acid.

As previously mentioned the aldehyde employed may be glyoxylic acid HCCOH,
$$\overset{\|}{O}$$

in which case no thio substituted carboxylic acid will be employed.

Frequently all of the reactants will be mixed together and heated in a suitable solvent, such as benzene, toluene, petrol, xylene, hexane or cyclohexane. Normally it will be desirable to have an acidic catalyst present such as p-toluene sulphonic acid, hydrochloric acid or metal chlorides suitable as Friedel Craft catalysts such as zinc chloride, aluminium trichloride, boron trichloride or stannic chloride.

In the case where the desired product is of the type

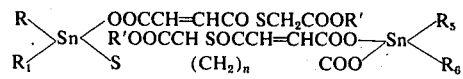

this may be obtained by the reaction under the influence of heat of a thio semi ester of the formula

HOOC CH = CH COS CH₂ COOR' with a dialkyltin oxide to give an intermediate of the formula

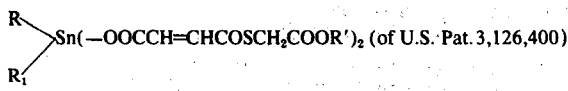

This product is then reacted with a diorganotin oxide of the formula

and with a sulphur-containing carboxylic acid of the formula

HS(CH₂)ₙ COOH

Compounds according to the invention find use as stabilisers for halogen-containing resins which include polymers or copolymers of vinyl chloride or vinylidene chloride, chlorinated vinyl chloride polymers and chlorinated polyethylene. Accordingly, from a further aspect the present invention provides a composition which comprises a halogen-containing resin and as a stabiliser therefor a compound of the formula

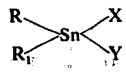

where R, R' X' and Y are as hereinbefore defined.

The organotin compounds will be present in compositions according to the invention in amounts so as to produce the desired stabilising effect, often this will be from 1 to 5% preferably 2 to 3% by weight based on the total amount of polymeric resin present.

Optionally, but advantageously, compositions according to the invention also contain hindered phenols, that is those having at least one substituent in a position ortho to the hydroxyl group as auxilliary stabilisers. Such phenols which are of use in compositions of the present invention include butylated hydroxyanisol, 2,6-di-tert.-butylphenol, methylene bis-(2,4-di-tert.-butylphenol), methylene bis-(2,6-di-tert.-butylphenol), methylene bis-(2,6-di-tert.-butyl-3-methylphenol), 4,4'-butylidene bis-(6-tert.-butyl-3-methylphenol), methylene bis-(4-ethyl-6-tert.-butylphenol), methylene bis-(4-methyl-2,6-di-tert.-butylphenol). Particularly preferred, however, is 2,6-di-tert.-butyl-4-methylphenol. Such phenols may be present in an amount of up to 3%, preferably from 0.01 to 0.05% by weight of the resin and will normally be present at about 4–10% by weight, preferably 5–8%, based on the total amount of organotin compounds used.

Esters of phosphorus and thiophosphorous acid may be employed in compositions according to the invention. Such compounds include halo-phosphites such as tris chloropropyl phosphite and polymeric phosphites such as hydrogenated 4,4' isopropylidene diphenol. Preferred phosphites and thiophosphites, however, are monomers having no substituents in the organo-group and having no more than one sulphur atom. These include triaryl phosphites and trialkyl phosphites. Such compounds include, for example, triphenyl phosphite, trixylylphosphite trinonyl phenyl phosphite and trioctyl phosphite. Diesters of phosphorous acid such as diisopropyl phosphite, dibutyl phosphite and diphenyl phosphite are also of use. Particularly preferred, however, are the mixed alkyl aryl phosphites such as octyl diphenyl phosphite, isodecyl diphenyl phosphite and di-isodecyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabiliser composition is also useful if it is employed in a polymer composition containing an epoxy compound, as may be desired for example in cases where a delay of initial colour change is desired. Epoxy compounds which may be employed in such compositions include butyl epoxy stearate, esters of epoxidised oleic acid and compounds of the formula

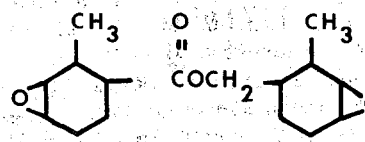

Organotin formulations as described above, optionally including a hindered phenol, an alkylaryl phosphite or aryl phosphite or an epoxide, will often be used as the only stabiliser in a polymeric vinyl chloride or vinylidene chloride composition. However, if desired conventional thermal stabilisers may also be included. These may include, for example, metal soap stabilisers, such as cadmium barium or zinc salts of fatty acids, or lead salts such as lead carbonate or stearate or dibasic lead phosphate or phthalate, or tribasic lead sulphate or conventional organotin stabilisers such as dibutyltin dilaurate or dibutyltin maleate or sulphur-containing compounds such as dibutyltin bisthioglycollates.

In the practice of the invention the stabiliser formulation may be mixed with the copolymer resin in the conventional manner for example by milling with the resin on heated rolls at about 150°C, although higher temperatures may be used when convenient, or by being mixed with particles of the polymer and then melting and extruding the mixture or by adding the stabiliser to a liquid resin.

Resins which may be used in compositions according to the invention normally contain at least 40% by weight of chlorine. Usually it will be a polymer or copolymer of vinyl chloride or vinylidene chloride but post-halogenated polyvinyl chloride or post-halogenated polyolefines, such as polyethylene, may be employed if desired. Suitable monomers which may form such copolymers with vinyl chloride and vinylidene chloride include for example acrylonitrile, vinyl acetate, methyl methacrylate, diesters of fumaric acid and maleic acid, ethylene, propylene and lauryl vinyl ether. These co-monomers may be present in an amount of up to 25% of the total weight of monomers copolymerised.

The organotin stabiliser formulation may be employed in either plasticised resin compositions, for example those plasticised with carboxy ester plasticisers or may be employed in rigid compositions. Such rigid compositions contain little or no plasticiser although for some applications up to about 10% by weight of plasticiser may be present. This is in contrast with plasticised compositions where the amount of plasticiser present is normally greater than 50% by weight of the polymeric material and is often greater than 100% on that basis.

The process of the invention will be illustrated by the following examples:

EXAMPLE 1

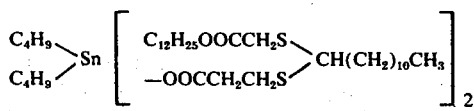

A mixture of β-mercaptopropionic acid (21.2g., 0.2M), lauryl thioglycollate (52g., 0.2M) and dodecyl aldehyde (36.8g., 0.2M) were heated under reflux in 300 ml. of benzene containing 0.1 gm. of p-toluene sulphonic acid until 3.6 ml. of water had collected. Then 24.9 gm. (0.1M) of dibutyltin oxide was added and refluxing continued until another 1.8 ml. of water had distilled. Benzene was removed from the warm mixture under reduced pressure and finally the product (light yellow liquid) filtered under vacuum.
(Calculated Sn = 9.1%; Found Sn = 9.4%).

EXAMPLE 2

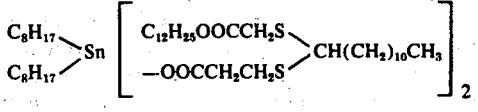

The procedure of Example 1 was followed using the following quantities of reactants:

| | |
|---|---|
| β-mercaptopropionic acid | 10.6g (0.1M) |
| lauryl thioglycollate | 26.0g (0.1M) |
| dodecyl aldehyde | 18.4g (0.1M) |
| dioctyltin oxide | 18.0g (0.05M) |

The product is a clear yellow liquid.
(Calculated Sn = 8.2%; Found Sn = 8.2%).

EXAMPLE 3

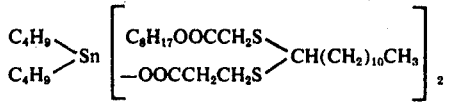

The procedure of Example 1 was followed using the following quantities of reactants (without any catalyst).

| | |
|---|---|
| iso-octyl β-mercaptopropionate | 54.5g (0.25M) |
| β-mercaptopropionic acid | 26.5g (0.25M) |
| Salicylaldehyde | 30.6g (0.25M) |
| dibutyltin oxide | 30.1g (0.125M) |

The product is a clear yellow liquid.
(Calculated Sn = 10.9%; Found Sn = 10.7%).

EXAMPLE 4

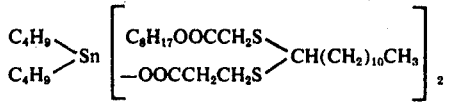

The procedure of Example 1 was followed using the following quantities of reactants (in toluene):

| | |
|---|---|
| dodecylaldehyde | 0.4 M |
| β-mercaptopropionic acid | 0.4 M |
| iso-octyl thioglycollate | 0.4 M |
| dibutyltin oxide | 0.2 M |

The product is a yellow liquid.

(Calculated Sn = 10.0%; Found Sn = 10.1%)
S = 10.8%; S = 11.1%
H = 9.4%; H = 9.6%
C = 58.8%; C = 59.6%

EXAMPLE 5

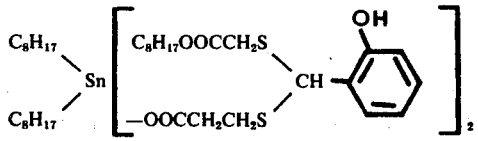

The procedure of Example 1 was followed using the following quantities of reactants (in presence of very small quantity of zinc chloride (0.1g) instead of p-toluene sulphonic acid):

| | |
|---|---|
| Salicylaldehyde | 30.6g (0.25M) |
| iso-octyl thioglycollate | 51.0g (0.25M) |
| β-mercaptopropionic acid | 26.5g (0.25M) |
| dioctyltin oxide | 45.1g (0.125M) |

The product is a clear oily liquid.
(Calculated Sn = 10.1%; Found Sn = 10.0%)

EXAMPLE 6

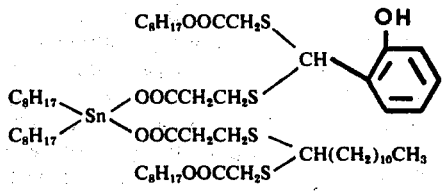

A mixture of 1-mercaptopropionic acid 1-mercapto isooctyl glycollate 2-n-decyl ethane

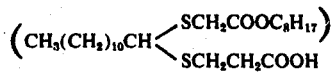

(0.05 M, prepared as in Example 4 step 1), 2-hydroxy benzal (mono mercaptopropionic acid mono mercapto iso-octyl glycollate)

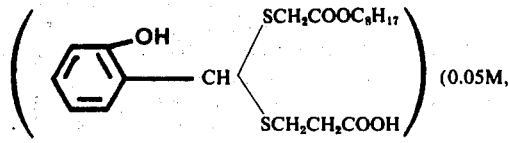

(0.05M, prepared as in Example 5 step 1) and dioctyltin oxide (0.05M) were heated under reflux in benzene until calculated amount of water had collected. The benzene was removed and finally the product filtered under vacuum.

The product is a clear yellow liquid.
(Calculated Sn = 9.6%; Found Sn = 9.8%)

EXAMPLE 7

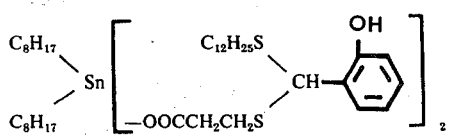

The procedure of Example 1 was followed using the following quantities of reactants (using conc. hydrochloric acid and water mixture, 1 ml (ratio 1 : 3 respectively) instead of p-toluene sulphonic acid):

| | |
|---|---|
| salicylaldehyde | 24.4g (0.2M) |
| β-mercaptopropionic acid | 26.5g (0.2M) |
| lauryl mercaptan | 40.1g (0.2M) |
| dioctyltin oxide | 36.1g (0.1M) |

The product is a yellow liquid.
(Calculated Sn = 10.17%; Found Sn = 10.56%).

EXAMPLE 8

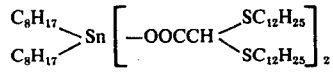

A mixture of di(lauryl sulphide) acetic acid (46g., 0.1M) and dioctyltin oxide (18.0g., 0.05M) were heated in benzene (300 ml) till the calculated amount of water had collected. The hot mixture was filtered rapidly under reduced pressure, which on cooling at room temperature gave a waxy solid product. The waxy solid was filtered under reduced pressure and then dried on a filter paper to complete the evaporation of benzene. (Calculated Sn = 9.4%; Found Sn = 10.3%).

EXAMPLE 9

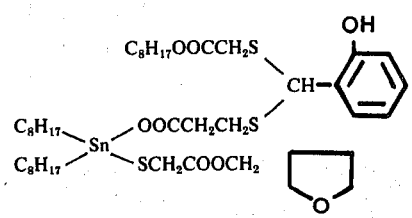

A mixture of

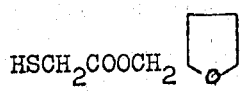

(0.1M, 2-hydroxy benzal (mono-mercaptopropionic acid mono-mercapto iso-octyl glycollate) (0.1M) and dioctyltin oxide (0.1M) were heated under reflux in benzene (250 ml). The yellow product was obtained by the same method as in Example 6.
(Calculated Sn = 12.7%; Found Sn = 11.3%)

EXAMPLE 10

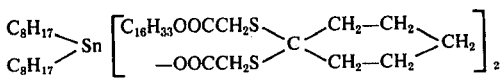

Cyclohexyl 1, 1-bis (mercapto acetic acid) (52.8g., 0.2M) and cetyl alcohol (48.4g., 0.2M) were reacted in toluene in presence of p-toluene sulphonic acid to give monocetyl derivative of cyclohexyl 1,1-bis(mercaptoacetic acid).

36.07g (0.1M) of dioctyltin oxide was added into the above mixture, and the mixture further refluxed till the calculated amount of water had collected as above.

The product is a yellow liquid.
(Calculated Sn = 9.0%; Found Sn = 8.9%).

EXAMPLE 11

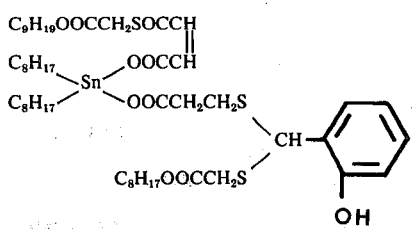

The thiosemiester ($C_9H_{19}OOCCH_2SOCCH = CHCOOH$) was prepared by reacting nonylthioglycollate (1M) and maleic anhydride (1.1M) in toluene (400 ml) under reflux for 1 hour. The reaction mixture was cooled, washed in a separating funnel three times with water and then dried over sodium sulphate. Toluene was removed from the product by distillation under reduced pressure and finally it was filtered under vacuum.

Thiosemiester (0.1M), 2-hydroxy benzal (mono mercaptopropionic acid mono mercapto iso-octyl glycollate (0.1M) and dioctyltin oxide (0.1M) were reacted as in Example 6.

The product is a yellow liquid.
(Calculated Sn = 11.0%; Found Sn = 11.3%).

EXAMPLE 12

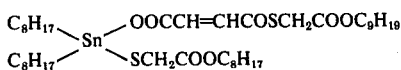

The thiosemiester (3.6g., 0.1M), iso-octylthioglycollate (20.4g., 0.1M) and dioctyltin oxide (36.07g., 0.1M) were reacted in benzene as in Example 6.

The product is a yellow liquid.
(Calculated Sn = 13.6%; Found Sn = 13.1%).

EXAMPLE 13

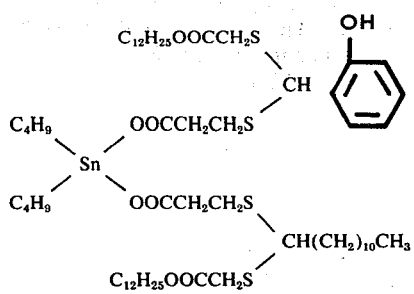

The procedure of Example 6 was followed using the following quantities of reactants (in presence of one drop of conc. hydrochloric acid).

| | | |
|---|---|---|
| (a) | 1-mercaptopropionic acid 1-mercaptolauryl glycollate 2-n-decyl ethane | 0.15M |
| (b) | 2-hydroxy benzal (monomercaptopropionic acid mono-mercapto lauryl glycollate) | 0.15M |
| (c) | dibutyltin oxide | 0.15M |

This product is a light yellow liquid.
(Calculated Sn = 9.6%; Found Sn = 10.2%).

EXAMPLE 14

ETH—OOCCH₂SOCCH CHCOSCH₂COOETH

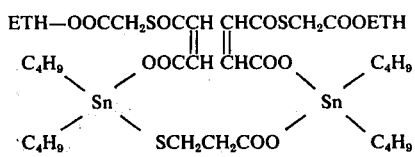

(where ETH represent 2-ethyl hexyl)

A mixture of thiosemiester (HOOCCH=CHCOSCH₂COOETH) (60.4g., 0.2M, prepared as in Example 11), dibutyltin oxide (24.9g., 0.1M) and toluene (250 ml) was refluxed in a Dean Stark apparatus until 1.8 ml of water had collected to give Bu₂Sn(—OOCCH=CHCOSCH₂COOETH)₂. Dibutyltin oxide (24.9g., 0.1M) was further added and the mixture again heated until a clear liquid containing

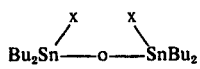

(where x = —OOCCH=CHCOSCH COOETH) was obtained. 10.6g (0.1M) of β-mercaptopropionic acid was added and the resulting mixture again refluxed until 1.8 ml of water were removed. The toluene was then distilled off under reduced pressure and the product recovered as a light yellow liquid after filtering under vacuum.
(Calculated Sn = 20.2%; Found Sn = 20.05%).

EXAMPLE 15

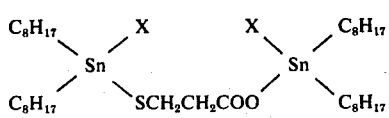

(where X = —OOCCH=CHCOSCH₂COO 2-ethyl hexyl)

The procedure of Example 14 was followed using the following quantities of reactants:

| | | |
|---|---|---|
| (a) | ETH—OOCCH₂SOCCH=CHCOOH | 60.4g (0.2M) |
| (b) | dioctyltin oxide | 36.07g (0.1M) |
| (c) | dioctyltin oxide | 36.07g (0.1M) |
| (d) | β-mercaptopropionic acid | 10.6g (0.1M) |

The product is a yellow liquid.
(Calculated Sn = 17.0%; Found Sn = 17.9%).

EXAMPLE 16

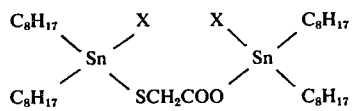

(where X = —OOCCH=CHCOSCH₂COO iso octyl).
The procedure of Example 14 was followed and the product is a yellow liquid.

EXAMPLE 17

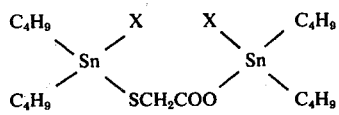

(where X = —OOCCH=CHCOSCH₂COO iso-octyl)
The procedure of Example 14 was followed and the product is a yellow liquid.

EXAMPLE 18

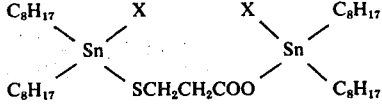

(where X = —OOCCH=CHCOSCH₂COOC₉H₁₉)
The procedure of Example 14 was followed and the product is a yellow liquid.

EXAMPLE 19

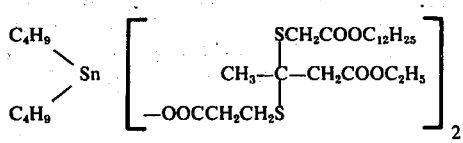

The procedure of Example 1 was followed using the following quantities of reactants:

| | | |
|---|---|---|
| (a) | Ethyl aceto-acetate | 13 g. (0.1M) |
| (b) | β-mercaptopropionic acid | 10.6 g. (0.1M) |
| (c) | Lauryl thioglycollate | 26.0 g. (0.1M) |
| (d) | Benzene | 150 ml |
| (e) | HCl (50% Conc. HCl + 50% H₂O) | 0.5 ml |
| (f) | Dibutyltin oxide | 12.5 g. (0.05M) |

The product is a light yellow liquid.

EXAMPLE 20

The stabilisers of the present invention can be used with halogen containing vinyl and vinylidene resins in which the halogen is attached directly to the carbon atoms of the polymer chain. Preferably, the resin is a vinyl halide resin, especially a vinyl chloride resin.

The stabilisers of the present invention can be incorporated with resin by admixing in an appropriate mill or mixer or by any of the other well known methods which provide for uniform distribution throughout the resin compositions. Thus mixing can be accomplished by milling on rolls at 100°–155°C. In addition to the novel stabilisers these can also be incorporated with resin conventional additives such as plasticizers, pigments, filters, dyes and ultraviolet absorbing agents.

If a plasticizer is employed, it is used in conventional amount e.g. 30 to 150 parts per 100 parts of resin. Typical plasticizers are di-2-ethyl hexyl phthalate, dibutyl sebacate, di-iso-octyl phthalate, and tricresyl phosphate.

The tin containing stabilisers are normally used in an amount of 0.01 to 10% by weight of the resin. More preferably 0.2 to 5% of the tin compound is used by weight of the resin.

The following example illustrates the stabilising effect of the additives of the present invention.

A series of rigid (non-plasticised) formulation was prepared having following composition:

| (a) | Corvic D55/9 | 100 Parts |
|---|---|---|
| (b) | Plastilube 30 (marked x if being added) | 0.5 or 1 Part |
| (c) | Stabiliser | 2 Parts (see Table I or 1 Part (see Table II) |

The stabiliser was added in the proportion as above and was fused (after thorough mixing) on a two-roller mill at 154°C (309°F) for 5 minutes. Samples were cut from the sheet and heated in an oven at 190°C (374°F).

Samples were withdrawn at 5 minute intervals and the discolouration (yellow) were noted by comparison with the Gardner scale.

TABLE I

| No. | Stabiliser | Colour after .... min at 190°C | | | | |
|---|---|---|---|---|---|---|
| | | 0 | 5 | 10 | 15 | 20 |
| (1)* | Mellite 31 ++ | 0 | 0 | 2 | 4 | 5 |
| (2) | Example 10 | 0 | 0 | 1 | 2 | 3 |
| (3) | Example 19 | 0 | 0 | 1 | 3 | |
| (4) | Example 3 | 0 | 0 | 1 | 2 | 4 |
| (5) | Example 12 | 0 | 1 | 4 | 4 | 6 |
| (6) | Example 1 | 0 | 0 | 1 | 3 | 5 |
| (7) | Example 5 | 0 | 0 | 1 | 1 | 2 |
| (8) | Example 6 | 2 | 3 | 4 | 4 | |
| (9) | Example 8 | 1 | 2 | 4 | 8 | |
| (10) | Bu$_2$Sn X$_2$ ++ | 1 | 1 | 3 | 5 | |
| (11) | OC$_2$Sn X$_2$ xx | 1 | 1 | 3 | 5 | |
| (12) | Example 4 | 0 | 0 | 2 | 4 | |

*Mellite 31 = Dibutyltin bis-iso-octyl thioglycollate.
xx Sn stabiliser used = 1.96 parts instead of 2 parts
++ Compounds tested for comparative purposes only.
X$_2$ —OOCCH=CHCOSCH$_2$COO iso Octyl

TABLE II

| No. | Stabiliser | Colour after ..... min at 190°C | | | | |
|---|---|---|---|---|---|---|
| | | 0 | 5 | 10 | 15 | 20 |
| (1)* | Mellite 31 | 1 | 1 | 3 | 5 | 6 |
| (2) | Example 14 | 0 | 0 | 0 | 1 | 3 |
| (3) | Example 17 | 0 | 0 | 0 | 1 | 3 |
| (4) | Example 15 | 0 | 0 | 0 | 1 | 8 |

*Mellite 31 = Dibutyltin bis-iso-octyl thioglycollate.

EXAMPLE 21

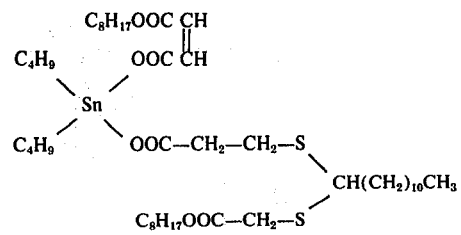

0.1 mole of HOOC CH=CH COOC$_8$H$_{17}$ (prepared from maleic anhydride and iso-octyl alcohol), 0.1 mole of

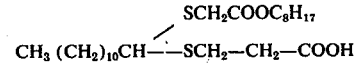

(prepared from dodecylaldehyde, iso-ocyle thioglycollate and β-mercaptoproprionic acid) and 0.1 mole of dibutyltic oxide were refluxed in tuluene till the calculated amount of water had collected in Dean Stark apparatus.

The product is a light yellow liquid.

| Analysis | |
|---|---|
| Found | Calculated |
| Sn = 12.7% | Sn = 12.7% |
| S = 7.5% | S = 6.8% |
| C = 58.1% | C = 57.7% |
| H = 8.79% | H = 9.0% |

Its structure was also confirmed by I.R. and N.M.R. analysis.

EXAMPLE 22

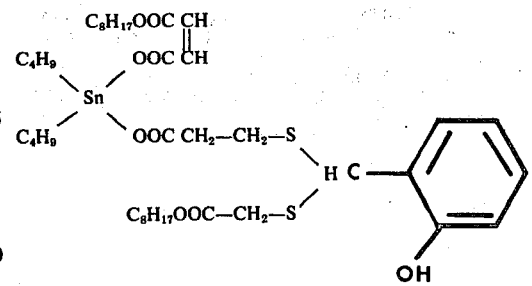

It was prepared by the same method as in Example 21, using the following starting materials:

(A) HOOC CH=CH COO C$_8$H$_{17}$  0.1M (B) (C$_4$H$_9$)$_2$ SnO  0.1M

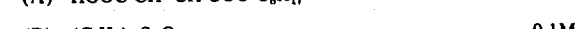
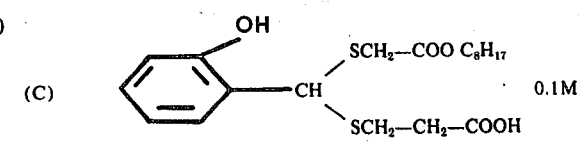

(C was prepared from salicylaldehyde, iso-octyl thioglycollate and β-mercaptopropionic acid).
The product is a light yellow liquid.

| Analysis | |
|---|---|
| Found | Calculated |
| Sn = 14.1% | Sn = 13.6% |
| S = 8.4% | S = 7.3% |

Its structure was also confirmed by I.R. and N.M.R. analysis.

EXAMPLE 23

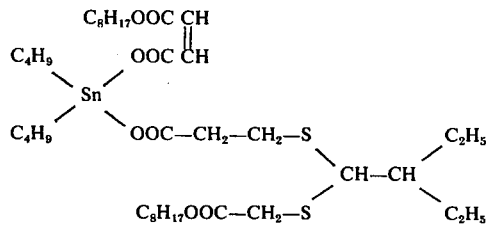

It was prepared by the same as in Example 21 using the following starting materials:

(A) HOOC CH=COOC$_8$H$_{17}$  0.1M (B) (C$_4$H$_9$)$_2$SnO  0.1M (C) 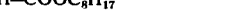

(C was prepared from iso-octyl thioglycollate, β-mercaptopropionic acid and 2-ethylbutyraldehyde).

The product is a light yellow liquid.

| Analysis | |
|---|---|
| Found | Calculated |
| Sn = 13.4% | Sn = 13.9% |
| S = 7.5% | S = 7.5% |
| C = 56.63% | C = 55.1% |
| H = 7.98% | H = 8.4% |

The structure was also confirmed by I.R. and N.M.R. analysis.

EXAMPLE 24

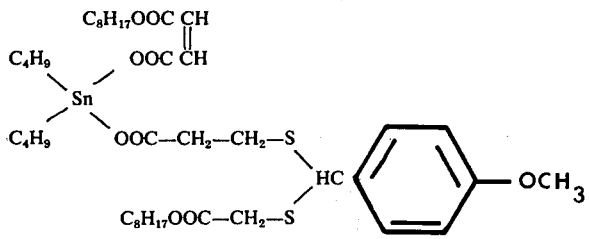

It was prepared by the same method as in Example 21, using the following starting materials:

(A) HOOC CH=CH COOC$_8$H$_{17}$  0.1M (B) (C$_4$H$_9$)$_2$SnO  0.1M (C) CH$_3$O—⟨⟩—CH⟨S—CH$_2$—COOC$_8$H$_{17}$ / S—CH$_2$—CH$_2$—COOH⟩  0.1M (C was prepared from iso-octyl thioglycollate, β-mercaptopropionic acid and anisaldehyde).

The product is a yellow liquid.

| Analysis | |
|---|---|
| Found | Calculated |
| Sn = 12.7% | Sn = 13.4% |
| S = 7.1% | S = 7.2% |
| C = 56.27% | C = 56.6% |
| H = 7.29% | H = 7.6% |

Its structure was also confirmed by I.R. and N.M.R. analysis.

EXAMPLE 25

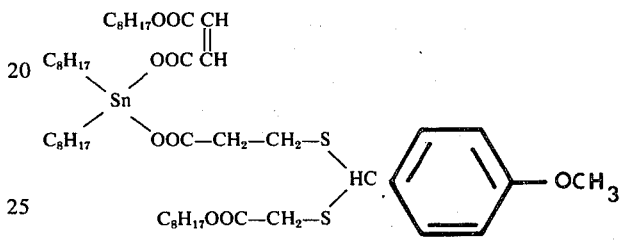

It was prepared by the same method as in Example 24 (using dioctyltin oxide O.I.M, instead of dibutyltin oxide).

The product is a yellow liquid.

| Analysis | |
|---|---|
| Found | Calculated |
| Sn = 11.5% | Sn = 11.8% |
| S = 6.5% | S = 6.4% |

Its structure was also confirmed by I.R. and N.M.R. analysis.

EXAMPLE 26

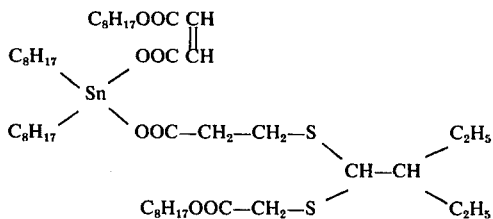

It was prepared by the same method as in Example 23 (using dioctyltin oxide O.I.M., instead of dibutyltin oxide).

The product is a light yellow liquid.

| Analysis | |
|---|---|
| Found | Calculated |
| Sn = 11.8% | Sn = 12.3% |
| S = 6.53% | S = 6.6% |

Its structure was also confirmed by I.R. and N.M.R. analysis.

EXAMPLE 27

The stabilizers of the present invention can be used with halogen containing vinyl and vinylidene resins in which the halogen is attached directly to the carbon atoms of the polymer chain. Preferably the resin is vinyl halide resin, especially a vinyl chloride resin.

The stabilizers of the present invention can be incorporated with resin by admixing in an appropriate mill or mixer or by any of the other well known methods provided for uniform distribution throughout the resin composition. Thus mixing can be accomplished by milling on rolls at 100°–160°C. In addition to the novel stabilizers these can also be incorporated with resin conventional additives such as plasticizers, pigments, filters, dyes and ultraviolet absorbing agents.

If a plasticizer is employed, it is used in conventional amounts e.g. 30 to 150 parts per 100 parts of resin. Typical plasticizers are di-2-ethyl hexyl phthalate, di-butyl sebacate and di-iso-phthalate.

The tin containing stabilizers are normally used in an amount of 0.01 to 10% by weight of the resin. More preferably 0.2 to 5% of the tin compound is used by weight of the resin.

A number of compounds of the present invention were tested for initial colour development against known stabilizers on an equal tin basis and it was shown that they compacted favourably (see Table I).

The following example illustrates the stabilizing effect of the compounds of the present invention (with and without additives) in comparison with known stabilizers (i.e. Mellite 31C or dibutyltin bis(iso-octyl thioglycollate) or dioctyltin bis(iso-octylthioglycollate) containing equal amount of tin rigid P.V.C. composition.

A series of rigid (now plasticized) formulation was prepared having following composition:

a. Corvic D55/09 .......................... 100 Parts b. Plastilube 30 Marked T if added and the amount present in part per 100 parts of polymer are indicated inside the brackets. In many instances of the present invention plastilube has not been added to the polymer due to the reason that, many of the compounds tested are themselves acting as lubricant during milling at 155°C.

c. Stabilizers and additives All examples in Table III have been tested (with and without additives) separately in comparison with Mellite 31C or pure dibutyltin bis(isooctyl thioglycollate) or pure dioctyltin bis-(iso-octyl thioglycollate) containing equal amount of tin in definite amount of corvic D55/09 (usually 300 gms.)

TABLE III

Testing of stabilizers (with and without additives) in comparison with Mellite 31C or dibutyltin bis(iso-octyl thioglycollate) or dioctyltin bis(iso-octyl thioglycollate) containing equal amount of tin in P.V.C.

| S No. | Example No. | Example — with and without additives or pure stabilizers | Parts of compound or mixture of compounds in 100 Parts of P.V.C. | Colour on Gardner scale after given time (in min) at 190°C | | | |
|---|---|---|---|---|---|---|---|
| | | | | 0 | 5 | 10 | 15 |
| (1) | Example 21 | a. M31C + T(0.5) | a. Tin equivalent to b | 0 | 0 | 1–2 | 5 |
| | | b. Exp.21 + T(0.33) | b. 1.97 Part | 0 | 0 | 1 | 3 |
| | | c. Exp.21(95) + B(5) + T(0.33) | c. Tin equivalent to b | 0 | 0 | 1 | 1–2 |
| (2) | Example 25 and Example 26 | a. Example 25 | a. 1.66 Part | 0 | 0 | 1–2 | 2–3 |
| | | b. OC$_2$Sn(SCH$_2$COOC$_8$H$_{17}$) + T(0.5) | b. Tin equivalent to a | 0 | 3 | 6–7 | — |
| | | c. Example 26 | c. do. | 0 | 0 | 1 | 4 |
| (3) | Example 26 | a. Example 26 | a. 1.33 Part | 0 | 0 | 1–2 | |
| | | b. OC$_2$Sn(SCH$_2$COOC$_8$H$_{17}$)$_2$ + T(0.5) | b. Tin equivalent to a | 2 | 4 | 8 | |
| | | c. Exp.26 + A (0.2) | c. do. | 0 | 0 | 3 | |
| | | d. Exp.26 + C (0.2) | d. do. | 0 | 0 | 3 | |
| | | e. Exp.26 + F (0.2) | e. do. | 0 | 0 | 4 | |
| (4) | Example 23 | a. Bu$_2$Sn(SCH$_2$COOC$_8$H$_{17}$)$_2$ + T(0.5) | a. 0.9 Part | 0 | 3 | 7 | |
| | | b. Example 23 | b. Tin equivalent to a | 0 | 0 | 2 | |
| (5) | Example 24 | a. Example 24 | a. 1.66 Part | 0 | 0 | * | |
| | | b. Bu$_2$Sn(SCH$_2$COOC$_8$H$_{17}$)$_2$ + T(0.5) | b. Tin equivalent to a | 0 | 1–2 | 6 | |

\* represent slightly pink tinge
( ) shows the parts of compound and also:-
A represents D.E.S. (Butyl epoxy stearate)
F represents iso-octyl thioglycollate
B represents BuSn(SCH$_2$COOC$_8$H$_{17}$)$_3$
T represents Plastilube 30
C represents Mellite 313

We claim:
1. A resin composition stabilized against the deteriorative effects of heat, the composition comprising
  1. a halogen-containing resin selected from the group consisting of homopolymers of vinyl chloride and vinylidene chloride, chlorinated polyethylene and copolymers of vinyl chloride or vinylidene chloride with ethylenically unsaturated monomers and
  2. an organotin stabilizer of the general formula

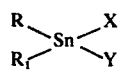

where R and $R_1$ are the same or different and are $C_1$ to $C_{12}$ alkyl groups, cycloalkyl groups or phenyl groups,
X is

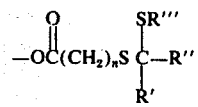

where
  $R'$ is hydrogen, $C_1$ to $C_{20}$ alkyl, cycloalkyl, phenyl, hydroxyphenyl or methoxyphenyl
  $R''$ is $C_1$ to $C_{20}$ alkyl, phenyl, hydroxyphenyl or methoxyphenyl wherein $R_2$ is a short chain alkyl group of 1 to 8 carbon atoms
  $R'''$ is $R_3$ or $-(CH_2)_nCOOR_3$
  where $R_3$ is an alkyl radical of from 1 to 20 carbon atoms, a cycloalkyl group or a phenyl group and n is an integer from 1 to 4 or
X is

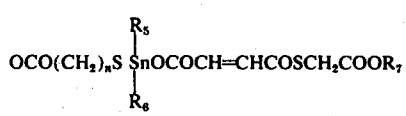

where $R_5$ and $R_6$ are selected from the same groups and R and $R_1$, and $R_7$ is selected from the same groups as $R'$ and
Y is either the same as X or is different from X and is selected from the same group of radicals as X or is $S(CH_2)_nCOOR_4$ or $OOCCH=CHCOOR_4$ or is $OOCCH=CHCOSCH_2COOR_4$ if X is

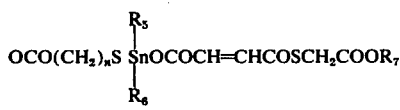

where $R_4$ is an alkyl group of from 1 to 20 carbon atoms, a cycloalkyl, phenyl or

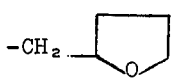

group.
2. A composition as described in claim 1 wherein X and Y each represent a radical of the formula

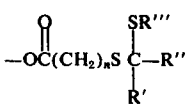

3. A composition as described in claim 2 wherein R and $R_1$ are identical and are alkyl radicals containing between 4 and 8 carbon atoms, inclusive, n is 1 or 2, $R'$ is hydrogen or a methyl radical, $R''$ is an alkyl radical containing between 1 and 20 carbon atoms, a hydroxyphenyl or methoxyphenyl radical or the radical $-CH_2COOR_2$ wherein $R_2$ represents an alkyl radical containing between 1 and 8 carbon atoms, inclusive, $R'''$ is $-(CH_2)_nCOOR_3$ and $R_3$ is an alkyl radical containing between 1 and 20 carbon atoms.

4. A resin composition as described in claim 1 wherein the resin contains at least 40% by weight of chlorine.

5. A resin composition as described in claim 1 wherein all or a major portion of the repeating units of the halogen-containing resin are derived from vinyl chloride or vinylidene chloride.

6. A resin composition as described in claim 1 wherein the concentration of organotin stabilizer is between 1 and 5%, based on the weight of the halogen-containing resin.

7. A resin composition as described in claim 1 which contains a hindered phenol in addition to the halogen-containing resin and organotin compound.

8. A resin composition as described in claim 1 which contains an ester of phosphorous or thiophosphorous acid in addition to the halogen-containing resin and organotin compound.

9. A resin composition as described in claim 8 wherein the ester is mixed alkyl aryl ester of phosphorous acid.

10. A composition as described in claim 1 wherein each of R and $R_1$ (and $R_5$ and $R_6$ if present) are the same.

11. A composition as described in claim 1 wherein R and $R_1$ are alkyl groups of from 4 to 8 carbon atoms.

12. A composition as described in claim 1 wherein $R_3$ is an alkyl group having from 8 to 16 carbon atoms.

13. A composition as described in claim 1 wherein $R_4$ is an alkyl group of from 8 to 16 carbon atoms.

14. A composition as described in claim 1 wherein $R'$ is hydrogen.

15. A composition as described in claim 1 wherein $R''$ is an alkyl group.

16. A composition as described in claim 1 wherein $R''$ is of the formula

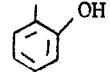

17. A composition as described in claim 1 wherein $R'$ is of the formula

18. A composition as described in claim 1 wherein $R'$ and $R''$ combine to form a 5 or 6 membered alicyclic ring.

19. A composition as described in claim 1 wherein the organotin compound exhibits a formula selected from the group consisting of

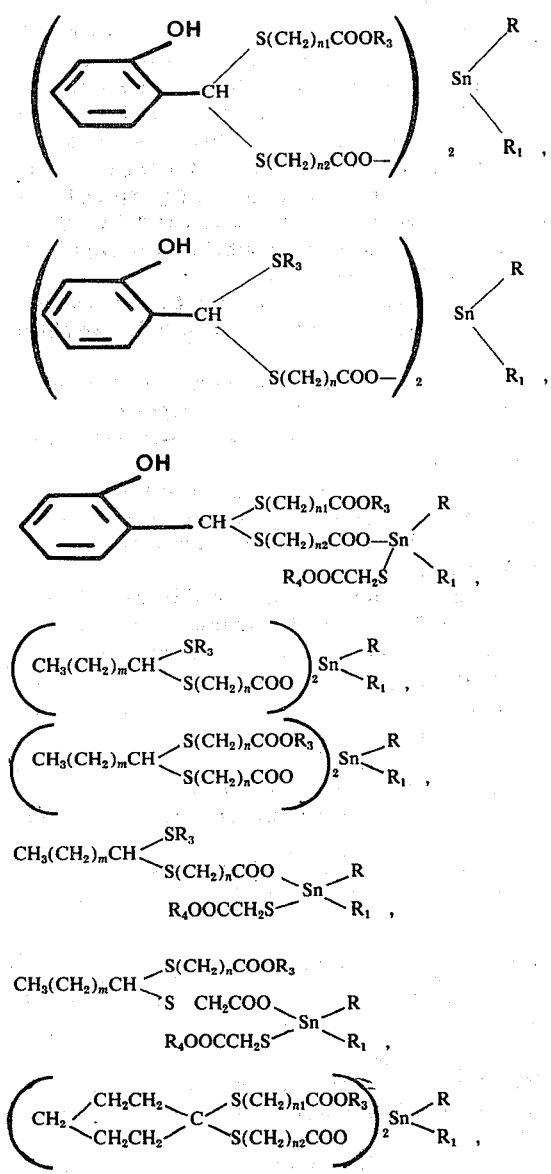
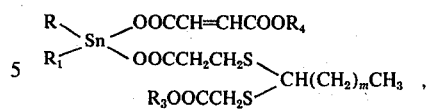
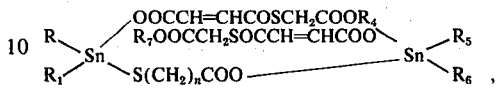
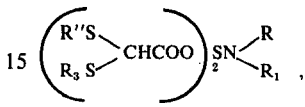
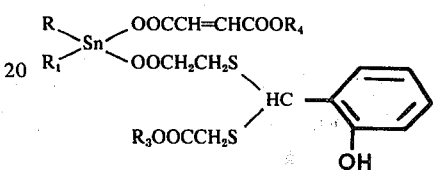
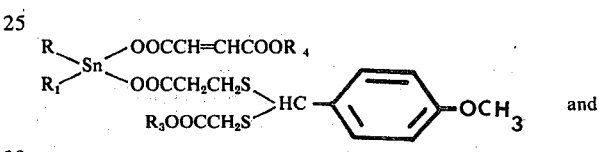 and
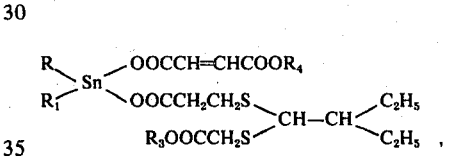
wherein $n1$ and $n2$ may be the same or different and are each either 1 or 2 and $m$ is an integer between 1 and 12, inclusive.
* * * * *

UNITED STATES PATENT OFFICE
CERTIFICATE OF CORRECTION

Patent No. 3,928,284　　　　　　　　　　Dated　December 23, 1975

Inventor(s)　John D. Collins et al.

It is certified that error appears in the above-identified patent and that said Letters Patent are hereby corrected as shown below:

On the title page, left column, between [62] and [52] insert the following:

--[30]　Foreign Application Priority Data...
　　　　November 19, 1971, United Kingdom No. 53892/71--

Signed and Sealed this

Third Day of August 1976

[SEAL]

*Attest:*

RUTH C. MASON
*Attesting Officer*

C. MARSHALL DANN
*Commissioner of Patents and Trademarks*